United States Patent
Kishimoto et al.

(10) Patent No.: US 9,313,371 B2
(45) Date of Patent: Apr. 12, 2016

(54) IMAGE PROCESSING APPARATUS, IMAGE PROCESSING METHOD AND NON-TRANSITORY COMPUTER READABLE MEDIUM FOR ELIMINATING A SPECIFIC COLOR IN AN IMAGE

(71) Applicant: FUJI XEROX CO., LTD., Tokyo (JP)

(72) Inventors: Hiroyuki Kishimoto, Kanagawa (JP); Shigeru Okada, Kanagawa (JP); Katsuya Koyanagi, Kanagawa (JP); Minoru Sodeura, Kanagawa (JP); Shintaro Adachi, Kanagawa (JP); Shinji Hanaoka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/527,198

(22) Filed: Oct. 29, 2014

(65) Prior Publication Data
US 2015/0271365 A1    Sep. 24, 2015

(30) Foreign Application Priority Data
Mar. 24, 2014  (JP) .................................. 2014-060836

(51) Int. Cl.
| | |
|---|---|
| H04N 1/58 | (2006.01) |
| H04N 1/60 | (2006.01) |
| G06T 5/00 | (2006.01) |
| G06T 7/40 | (2006.01) |
| H04N 1/62 | (2006.01) |
| G06T 5/40 | (2006.01) |
| H04N 1/407 | (2006.01) |

(52) U.S. Cl.
CPC ........ *H04N 1/58* (2013.01); *G06T 5/002* (2013.01); *G06T 5/009* (2013.01); *G06T 5/40* (2013.01); *G06T 7/408* (2013.01); *H04N 1/4074* (2013.01); *H04N 1/62* (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

2007/0279714 A1\* 12/2007 Higashikata ......... H04N 1/6058
358/518
2008/0292191 A1\* 11/2008 Okita ..................... H04N 1/387
382/187

FOREIGN PATENT DOCUMENTS

| JP | 10051655 A | \* | 2/1998 |
|---|---|---|---|
| JP | A-10-51655 | | 2/1998 |
| JP | 4164674 B2 | | 10/2008 |

OTHER PUBLICATIONS

Office Action issued in Japanese Patent Application No. 2014-060836 dated Oct. 28, 2014 (with translation).
Mar. 24, 2015 Office Action issued in Japanese Application No. 2014-060836.

\* cited by examiner

*Primary Examiner* — Bernard Krasnic
(74) *Attorney, Agent, or Firm* — Oliff PLC

(57) ABSTRACT

An image processing apparatus includes an elimination processing unit that eliminates a specific color in image information. The elimination processing unit does not consider a pixel having a saturation that exceeds a saturation threshold and a lightness that is lower than a lightness threshold, which corresponds to a hue of the pixel, as an elimination target and considers a pixel having a saturation that exceeds the saturation threshold and a lightness that is higher than a lightness threshold, which corresponds a hue of the pixel, as the elimination target.

3 Claims, 9 Drawing Sheets

FIG. 4

| SATURATION OF PIXEL | | | |
|---|---|---|---|
| EXCEED SATURATION THRESHOLD | LIGHTNESS OF PIXEL | EXCEED LIGHTNESS THRESHOLD | COLOR DROPOUT IS PERFORMED |
| | | NOT MORE THAN LIGHTNESS THRESHOLD | COLOR DROPOUT IS NOT PERFORMED |
| NOT MORE THAN SATURATION THRESHOLD | LIGHTNESS OF PIXEL | EXCEED LIGHTNESS THRESHOLD | COLOR DROPOUT IS NOT PERFORMED |
| | | NOT MORE THAN LIGHTNESS THRESHOLD | COLOR DROPOUT IS NOT PERFORMED |

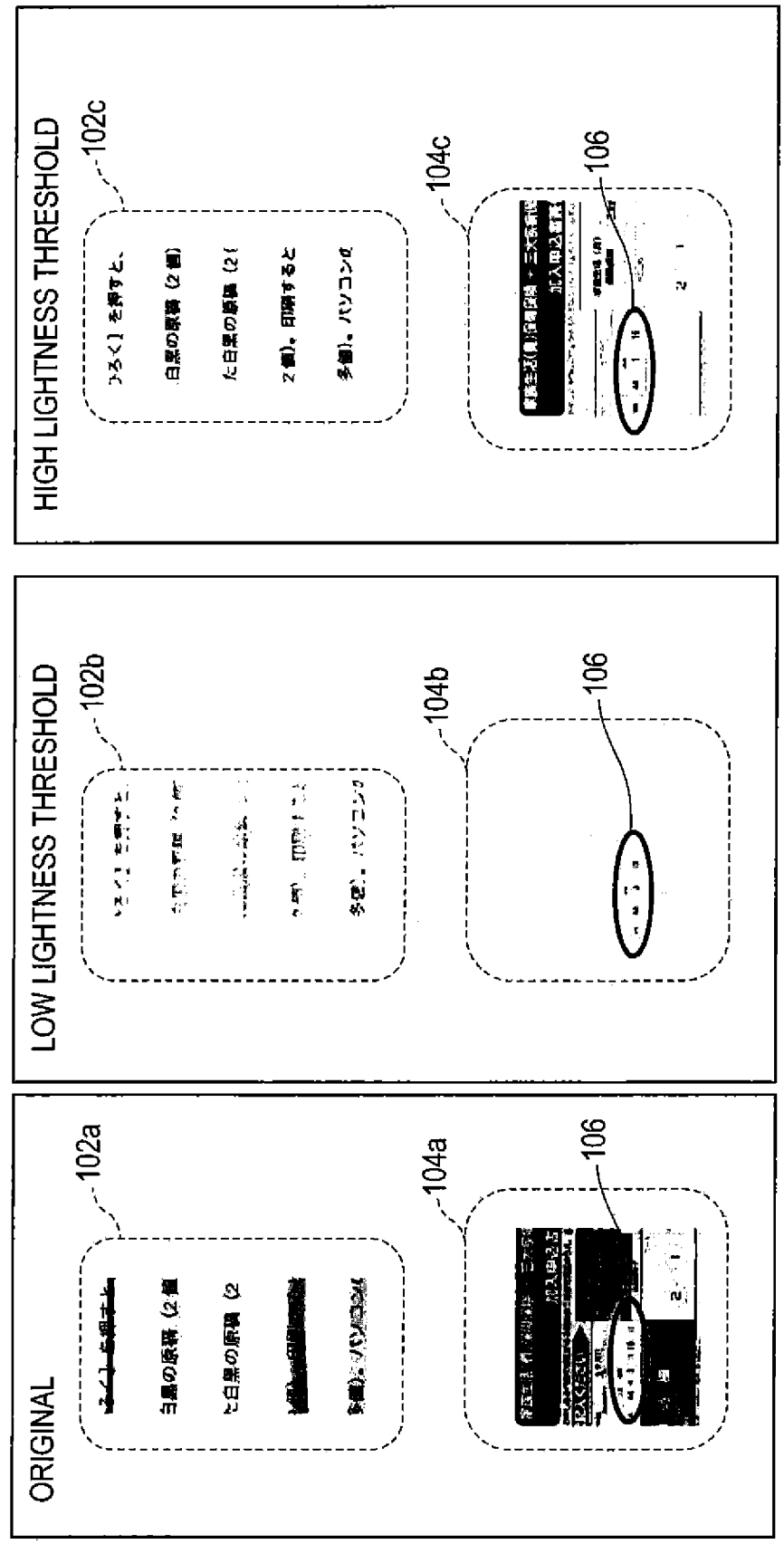

IMAGE PROCESSING APPARATUS, IMAGE PROCESSING METHOD AND NON-TRANSITORY COMPUTER READABLE MEDIUM FOR ELIMINATING A SPECIFIC COLOR IN AN IMAGE

CROSS-REFERENCE TO RELATED APPLICATIONS

This application is based on and claims priority under 35 USC 119 from Japanese Patent Application No. 2014-060836 filed Mar. 24, 2014.

BACKGROUND (i) Technical Field

The present invention relates to an image processing apparatus, an image processing method, and a non-transitory computer readable medium.

(ii) Related Art

In the related art, in the fields of optical character recognition (OCR) and the like, background elements in a document such as ruled lines are beforehand printed in a specific color, and the specific color is set not to be read by optical processing such as color filtering in such a manner that only black characters that have been written in the document are read. Such processing for eliminating a specific color from an image to be read is called "dropout", "color dropout", or the like.

In recent years, dropout of a specific color from color image information, which is obtained by scanning, has been digitally performed. In digital dropout processing, dropout of markings made by using, for example, fluorescent color markers and the like is performed in addition to the above-mentioned dropout of printed ruled lines and backgrounds.

In digital color dropout processing, for example, an image that has been read by a scanner (usually represented in the RGB color space) is converted so as to be represented in the HSL color space (H, S, and L are hue, saturation, and lightness, respectively), and the value of a pixel having a chromatic color (e.g., a pixel having a saturation equal to or higher than a predetermined threshold) is converted into a value that represents the ground color of the image (e.g., white). As a result, characters, figures, and images of black color remain in the image, which is obtained as a result of the conversion, whereas ruled lines and markings each having a high saturation will not remain in the image.

A marking made by using a marker or the like is often superposed with a character, a figure, or an image (hereinafter collectively referred to as "a character or the like") on a document. In the case where such a marking has been superposed with a character or the like, a portion of the character or the like with which the marking has been superposed may sometimes be eliminated from an image along with the marking through dropout processing. This is because, as a result of the marking having a high saturation being superposed with the portion of the character or the like, the saturation of the portion increases even though the character or the like has black color, and when the dropout processing is performed, the portion that is formed of high saturation pixels is dropped out.

SUMMARY

According to an aspect of the invention, there is provided an image processing apparatus including an elimination processing unit that eliminates a specific color in image information. The elimination processing unit does not consider a pixel having a saturation that exceeds a saturation threshold and a lightness that is lower than a lightness threshold, which corresponds to a hue of the pixel, as an elimination target and considers a pixel having a saturation that exceeds the saturation threshold and a lightness that is higher than a lightness threshold, which corresponds to a hue of the pixel, as the elimination target.

BRIEF DESCRIPTION OF THE DRAWINGS

Exemplary embodiments of the present invention will be described in detail based on the following figures, wherein:

FIG. 4 is a table for describing a determination process that is performed by the dropout processing unit;

FIG. 5 is an explanatory diagram illustrating variations in processing results of dropout processing due to variations in a lightness threshold;

FIG. 9 is a graph illustrating an example of a lightness threshold distribution that is used for leaving a black character or the like with which a marking has been superposed, dropping out a uniform portion having a chromatic color, and leaving a character or the like that is written by using a predetermined chromatic color pen or the like.

DETAILED DESCRIPTION

Figure 1:
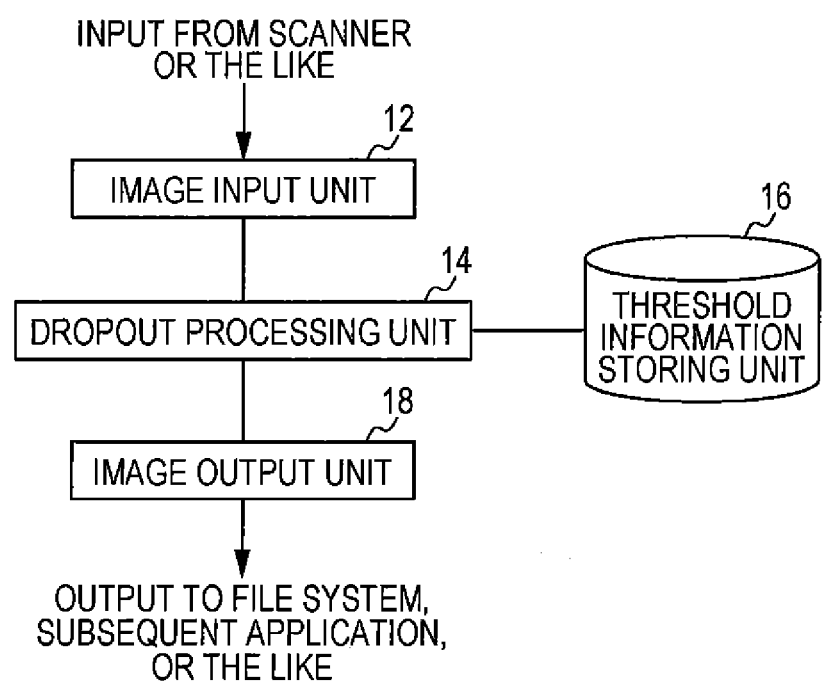
FIG. 1 is a diagram illustrating an exemplary functional configuration of an image processing apparatus according to an exemplary embodiment.

FIG. 1 illustrates an exemplary functional configuration of an image processing apparatus according to an exemplary embodiment of the invention. The image processing apparatus of this exemplary embodiment includes an image input unit 12, a dropout processing unit 14, a threshold information storing unit 16, and an image output unit 18.

Image data that is to be subjected to dropout processing is input to the image input unit 12 from, for example, a scanner or the like.

The dropout processing unit 14 performs dropout processing on the image data. The dropout processing is processing for, in the case where one of pixels of an image has a color that is within a specific range, converting the color of the pixel into a different specific color (typically, colorless or the base color of the image). The dropout processing unit 14 determines whether or not the colors of the pixels are to be dropped out by using threshold information that is stored in the threshold information storing unit 16. In the present exemplary embodiment, a threshold that relates to saturation (hereinafter referred to as a saturation threshold) and a threshold that relates to lightness (hereinafter referred to as a lightness threshold) are used for performing the determination. Information regarding the saturation threshold and information regarding the lightness threshold are stored in the threshold information storing unit 16. A process that is performed by the dropout processing unit 14 will be described in detail later.

An image that is obtained as a result of the dropout processing performed by the dropout processing unit 14 is output from the image output unit 18. The method of outputting the image is not particularly limited. For example, the image, which is obtained as a result of the dropout processing, may be stored in a file system as a file or may be output to another application (e.g., OCR software) that is configured to perform processing on an image that has undergone the dropout processing.

Exemplary contents of the process that is performed by the dropout processing unit 14 will now be described with reference to FIG. 2. First, in the process, the dropout processing unit 14 determines whether or not processing for the last pixel of image data, which has been input from the image input unit 12, has been completed (S10). In the case where the processing for the last pixel has not been completed, an unprocessed pixel, which is the next pixel in a predetermined pixel processing order, is retrieved as the next processing target (S12). Here, in the case where the color space in which each pixel value of the image data is represented is not the HSL color space (H, S, and L are hue, saturation, and lightness, respectively), the value of the pixel, which has been retrieved, is converted into a value represented in the HSL color space. Note that the conversion into values represented in the HSL color space may be collectively performed on all the pixels of the image data before starting the process that is illustrated in FIG. 2.

Next, the dropout processing unit 14 determines whether or not the lightness (L) value of the processing target pixel is lower than or equal to the lightness threshold that is stored in the threshold information storing unit 16 (S14). When the determination result is positive (Yes), the dropout processing unit 14 decides that the pixel is not to be dropped out. In other words, the dropout processing unit 14 outputs the pixel to the image output unit 18 without changing the pixel value (S16). A pixel that forms part of a black character or the like has a low lightness even if the saturation of the pixel increases as a result of a marking made by using a marker being superposed with the pixel. Thus, if the lightness threshold is appropriately set, the determination result in S14 is positive, and the color of the pixel (part of the black character or the like) is output as is without being dropped out.

When the determination result in S14 is negative (No), the dropout processing unit 14 determines whether or not the saturation of the processing target pixel is lower than or equal to the saturation threshold stored in the threshold information storing unit 16 (S18). The saturation threshold is a threshold that relates to saturation and that is used for distinguishing an achromatic color character or the like from a chromatic color marking made by using a marker or the like. The saturation threshold may be a value similar to a threshold that is used in a process of the related art of determining of chromatic color and achromatic color. When the determination result in S14 is positive, the dropout processing unit 14 decides that the pixel is not to be dropped out and outputs the pixel to the image output unit 18 without changing the pixel value (S20). When the determination result in S18 is negative (i.e., the saturation of the pixel exceeds the saturation threshold), the color of the pixel is dropped out (S22).

Figure 2:
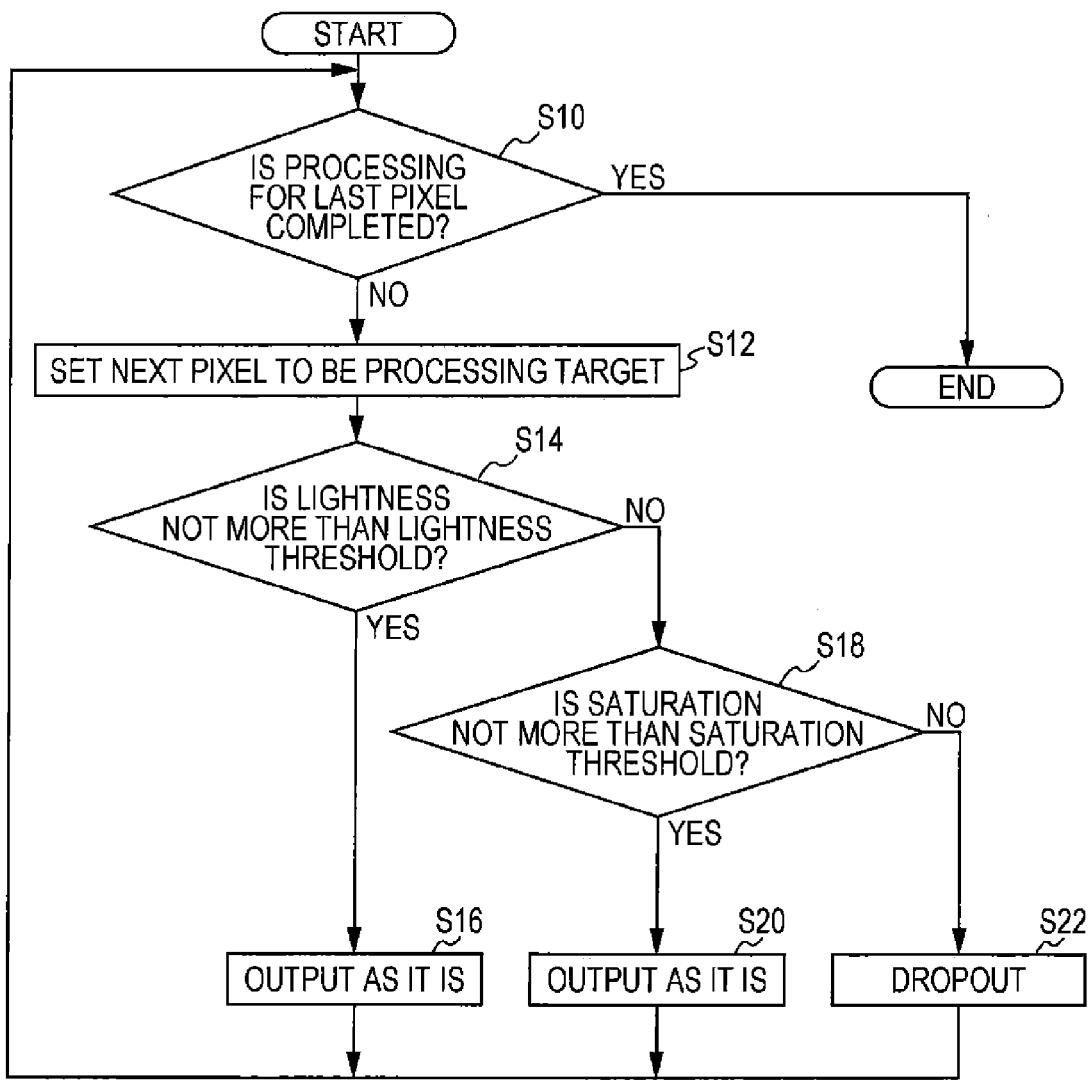
FIG. 2 is a flowchart illustrating an exemplary process that is performed by a dropout processing unit.

In the process illustrated in FIG. 2, the process returns to S10 after S16, S20, or S22 has been performed.

As described above, according to the process illustrated in FIG. 2, even in the case where a marking made by using a coloring material having a chromatic color such as a marker is superposed with an achromatic color character or the like, and the saturation of a processing target pixel increases when the processing target pixel is read by a scanner, a portion of the character or the like that has a lightness lower than or equal to the lightness threshold is not dropped out and the original value of the pixel of the portion is output as is (S14 and S16). Therefore, in the present exemplary embodiment, the occurrence of a situation where a character or the like, with which a marking has been superposed, is dropped out is suppressed as compared with the related art in which it is determined whether or not a pixel is to be dropped out only by the saturation of the pixel.

Figure 3:
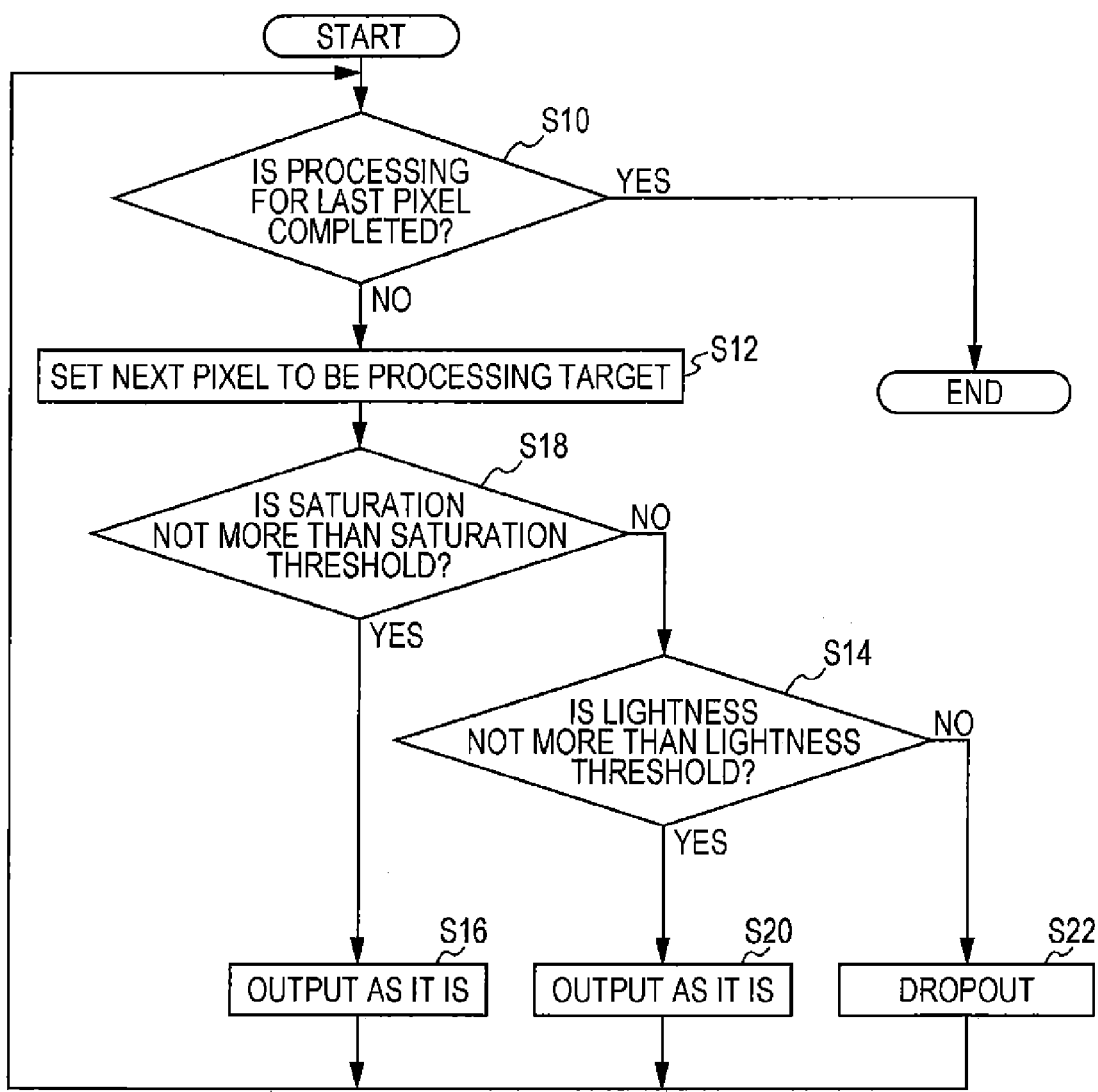
FIG. 3 is a flowchart illustrating another exemplary process that is performed by the dropout processing unit.

Although, in the example illustrated in FIG. 2, it is determined in S14 whether or not the lightness of a target pixel is lower than or equal to the lightness threshold, and when the determination result is negative, it is determined whether or not the saturation of the pixel is lower than or equal to the saturation threshold, these determination processes may be performed in reverse order. In the case where these determination processes are performed in reverse order, as illustrated in FIG. 3, it is determined first whether or not the saturation of the target pixel is lower than or equal to the saturation threshold (S18), and when the saturation is lower than or equal to the saturation threshold, the target pixel is output as is without being dropped out (S16). When the saturation of the target pixel exceeds the saturation threshold, it is further determined whether or not the lightness of the pixel is lower than or equal to the lightness threshold (S14), and when the lightness is lower than or equal to the lightness threshold, the pixel is output as is without being dropped out (S20). When the lightness of the pixel exceeds the lightness threshold, the pixel is dropped out (S22).

In the case of FIG. 2 in which lightness is determined first and also in the case of FIG. 3 in which, contrary to the case of FIG. 2, saturation is determined first, a target pixel is dropped out only in the case where both the saturation and the lightness of the target pixel exceed the saturation threshold and the lightness threshold, respectively. This relationship is illustrated in FIG. 4. As illustrated in FIG. 4, in the present exemplary embodiment, in the case where the saturation of a pixel exceeds the saturation threshold, when the lightness of the pixel exceeds the lightness threshold, the pixel is decided to be dropped out, and when the lightness of the pixel is lower than or equal to the lightness threshold, the pixel is not decided to be dropped out. In addition, in the case where the saturation of the pixel is lower than or equal to the saturation threshold, the pixel is not decided to be dropped out regardless of whether or not the lightness of the pixel exceeds the lightness threshold.

Although, in S14 and S18, both of which are illustrated in FIG. 2 and FIG. 3, it is determined whether or not the lightness and the saturation of a pixel are "lower than or equal to" thresholds, it may be determined whether or not the lightness and the saturation of a pixel are "lower than" the thresholds, as there will be no difference between these.

In the processes illustrated in FIG. 2 and FIG. 3, the dropout processing performance varies depending on what value the lightness threshold will be. This matter will now be described with reference to FIG. 5. FIG. 5 illustrates an original (i.e., before performing the dropout processing illustrated in FIG. 2 or FIG. 3) image sample and processing results one of which is obtained by performing the dropout processing on the image sample by using a low lightness threshold and the other one of which is obtained by performing the dropout processing on the image sample by using a high lightness threshold.

The original image sample includes a marker-superposed character string sample 102a and a document sample 104a in which a non-uniform character string 106 is printed in black color in a uniform portion that is printed in a chromatic color, the non-uniform character string 106 differing depending on the document. Although since grayscale is the only way to represent these samples, it is difficult to determine colors in FIG. 5, the marker-superposed character string sample 102a includes five character string samples that are provided with markings made by using markers, and the colors of the markings are red, fluorescent green, fluorescent yellow, light blue, and pink from the top in FIG. 5. The uniform portion of the document sample 104a is expressed by using several chromatic colors and does not have any achromatic color. Although it is difficult to determine colors from the image samples in FIG. 5, which are represented in grayscale, more specifically, the uniform portion includes a character string that is expressed in white on a background of dark blue, which has a relatively low lightness, a character string that is expressed in white on a background of red, which has a relatively high lightness, and a character string that is expressed in dark blue, which has a relatively low lightness, on a background of white or light blue.

In the case where the processing illustrated in FIG. 2 or FIG. 3 is performed on such an original image sample by using a relatively low lightness threshold, regarding the document sample 104a, a processing result 104b in which the uniform portion has been suitably dropped out, and in which only the black non-uniform character string 106 has been properly extracted may be obtained.

Since the lightness threshold is set low in this example, in the uniform portion, the lightnesses of the background and the characters of red, which has a relatively high lightness, and also the lightnesses of the background and the characters of dark blue, which has a relatively low lightness, are higher than the lightness threshold. Thus, the determination results for all the pixels of the uniform portion in S14 are No. In addition, it is determined in S18 that the saturation of each of the pixels exceeds the saturation threshold, and thus, the pixels are dropped out. Therefore, only the black non-uniform character string 106 remains after the dropout processing has performed.

On the other hand, in the marker-superposed character string sample 102a, as a result of the markings being superposed with the black characters and the like, the lightnesses of the black characters and the like increases when the black characters and the like are read by a scanner, and the lightnesses may sometimes exceed the lightness threshold, which is set relatively low. In addition, as described above, the saturations of portions of the black characters and the like with which the markings are superposed often exceed the saturation threshold. Therefore, in a processing result sample 102b that corresponds to the marker-superposed character string sample 102a, portions of the black character strings each of which has a lightness and a saturation that respectively exceed the lightness threshold and the saturation threshold due to the markings, which are superposed with the portion, have been dropped out in S22 and eliminated from the image sample.

As described above, in the case where the processing illustrated in FIG. 2 is performed by setting the lightness threshold relatively low, although the uniform portion, which is printed in a chromatic color, is suitably dropped out, the portions of the black character strings with which the markings are superposed may sometimes be dropped out.

In contrast, in an example in which the lightness threshold is set high to such an extent that the marker-superposed character string sample 102a will not be dropped out, as shown in a processing result sample 102c that corresponds to the marker-superposed character string sample 102a, the portions of the black character strings with which the markings have been superposed are left without being dropped out. However, in this example, since the lightness threshold is set high, it is determined in S14 that the lightnesses of the background and the characters of dark blue, which has a relatively low lightness, in the uniform portion of the document sample 104a are lower than or equal to the lightness threshold, and the background and the characters are left in the processing result 104c without being dropped out.

As described above, with the processing illustrated in FIG. 2, it is difficult to leave a character string with which a marking is superposed without dropping it out while dropping out a uniform portion that is printed in a chromatic color.

Accordingly, as a modification of the above-described exemplary embodiment, a method of adjusting a lightness threshold in accordance with hue will be described below.

In this modification, a lightness threshold is set to be higher within hue ranges of markers that are assumed to be used than within hue ranges that do not belong to any of the hue ranges of the markers. An example of the lightness threshold distribution, which is set as described above, is illustrated in FIG. 6.

Figure 6:
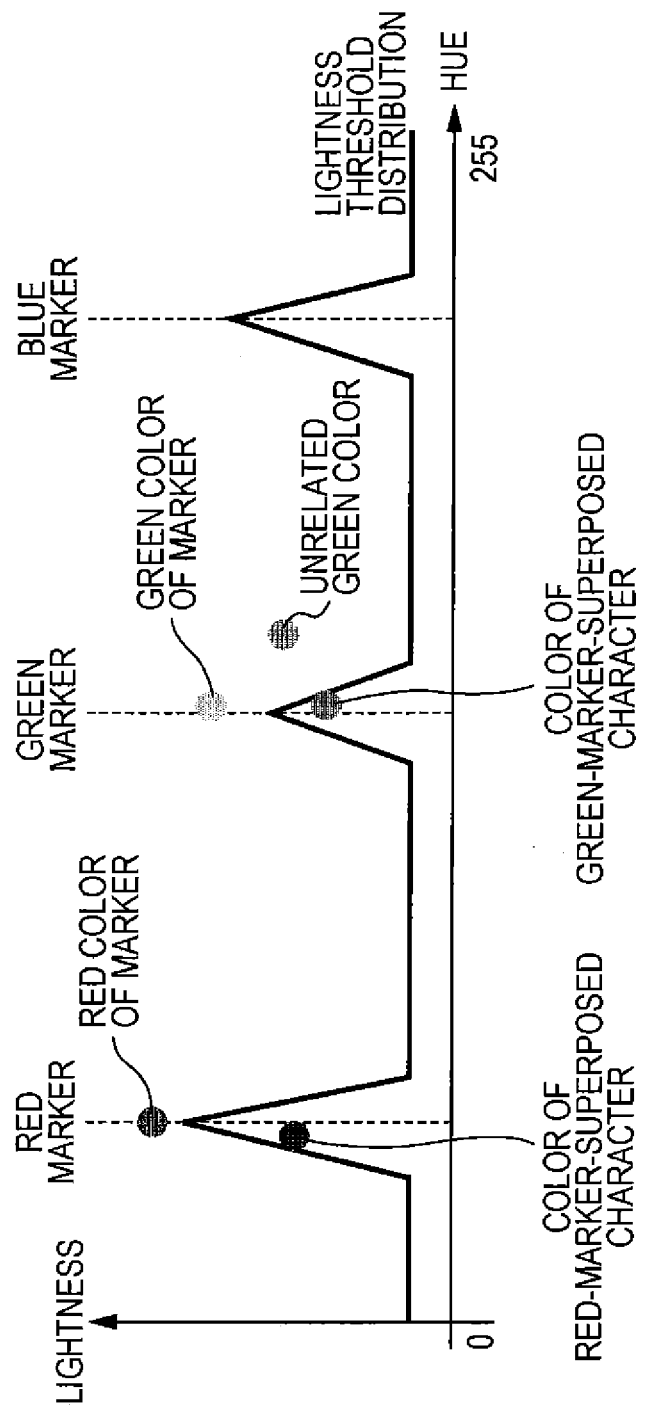
FIG. 6 is a graph illustrating an example of a lightness threshold distribution that is used for leaving a black character or the like with which a marking has been superposed and dropping out a uniform portion having a chromatic color.

The example illustrated in FIG. 6 is an example of a lightness threshold distribution that corresponds to three markers, which are a red marker, a green marker, and a blue marker. In the lightness threshold distribution illustrated in FIG. 6, the lightness threshold is set to be a relatively low fixed value in hue ranges that do not correspond to any of the colors of the red, green, and blue markers. The lightness threshold in these hue ranges is set to be a significantly low value so that it will not be determined in S14 that the lightness of a dark chromatic color, which has a relatively low lightness, of a uniform portion of a document is lower than or equal to the lightness threshold. On the other hand, the lightness threshold in hue ranges of the colors of the markers is set to be higher than the lightness threshold in the hue ranges except for the hue ranges of the colors of the markers, so that it is determined in S14 that the lightness of a portion of a black character or the like that has increased as a result of a marking, which is made by using one of the markers, being superposed with the portion is lower than or equal to the lightness threshold. However, the lightness threshold in the hue ranges of the colors of the markers is set to be such a value that it will not be determined in S14 that the color of a marking that is drawn with one of the markers on a sheet having a white background has a lightness that is lower than or equal to the lightness threshold. Note that the lightness of the color of such a marking drawn on a white background and the lightness of a black character or the like with which such a marking is superposed differ depending on the color of a marker that is used, and thus, an optimum value for a lightness threshold that corresponds to the hue range of the color of each marker may be calculated in advance by, for example, conducting an experiment or the like.

Although, in the exemplary lightness threshold distribution illustrated in FIG. 6, the lightness threshold distribution in the hue range of each of the markers forms a mountain-like shape, which has the lightness threshold that corresponds to the hue value of the marker as a vertex thereof, this is merely an example.

Information regarding such a lightness threshold distribution is stored in the threshold information storing unit 16.

An exemplary process that is performed by the dropout processing unit 14 in the modification will be described with reference to FIG. 7.

Figure 7:
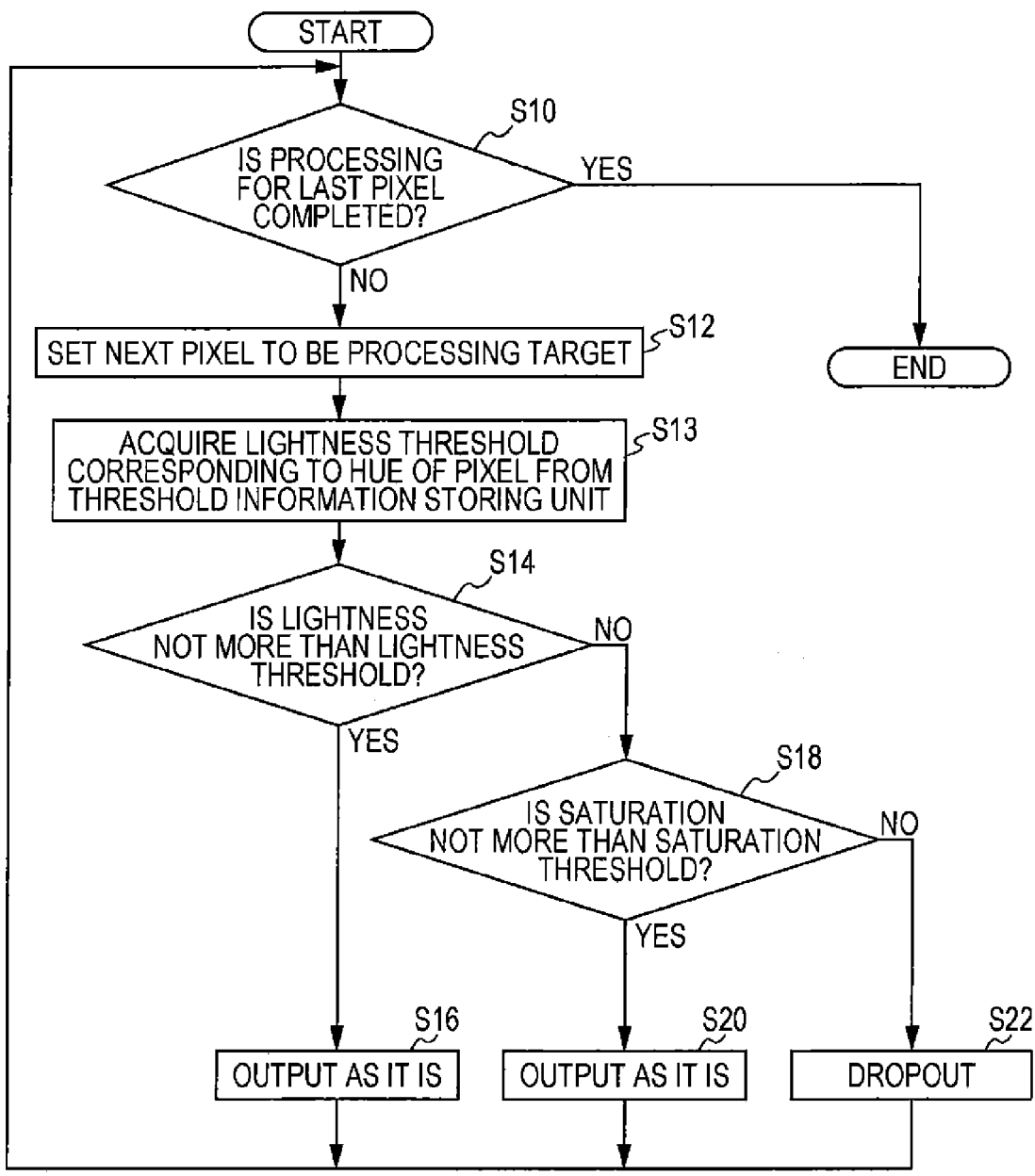
FIG. 7 is a flowchart illustrating an exemplary process that is performed by the dropout processing unit in a modification in which the lightness threshold distribution is used.

The process illustrated in FIG. 7 is formed by adding S13 to the process illustrated in FIG. 2. In the process illustrated in FIG. 7, after a processing target pixel has been determined in S12, a lightness threshold that corresponds to the hue value of the pixel is retrieved from a lightness threshold distribution stored in the threshold information storing unit 16 (S13). Then, it is determined in S14 whether or not the lightness of the processing target pixel is lower than or equal to the lightness threshold, which has been retrieved in S13. The rest of the process is similar to that in the process illustrated in FIG. 2.

Since the hue of a pixel that corresponds to a black character or the like with which a marking, which is made by using a marker, is superposed is the hue of the marker, a lightness threshold that corresponds to the hue of the marker (a value that is higher than the lightness thresholds in hue ranges except for the hue range of the marker) is retrieved in S13. In S14, the lightness of the pixel of the character or the like, with which the marking is superposed, is compared with the high lightness threshold, which has been retrieved. Therefore, even if the lightness of the pixel increases due to the marking, which has been superposed with the character or the like, it is determined in S14 that the lightness is lower than or equal to the lightness threshold, and the value of the pixel is output as is (without being dropped out) in S16.

On the other hand, regarding a pixel of a chromatic color uniform portion of a document, in the case where the hue of the chromatic color is different from all the hues of markers that are considered by the image processing apparatus of the exemplary embodiment, a low lightness threshold that corresponds to the hue that does not belong to any of the hue ranges of the markers is retrieved in S13. Therefore, it is determined in S14 that the lightness of the pixel exceeds the lightness threshold, and the process moves on to S18. Then, it is determined in S18 that the saturation of the pixel exceeds the saturation threshold, and as a result, the color of the pixel is dropped out. As described above, in the case where a color whose hue is different from all the hues of markers, which are assumed to be used, is used as the color of a uniform portion of a document, the dropout processing unit 14 drops out the uniform portion.

Figure 8:
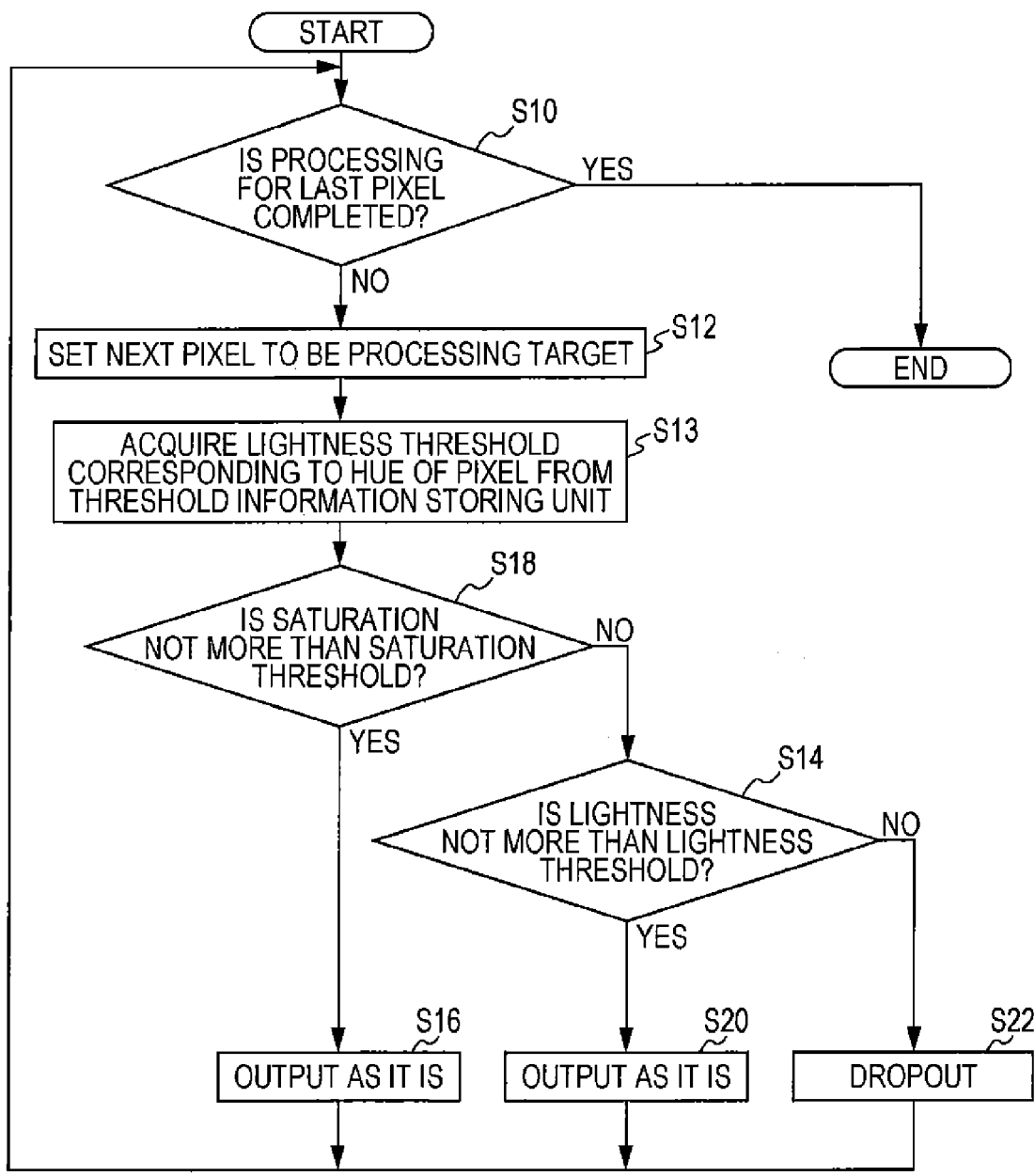
FIG. 8 is a flowchart illustrating another exemplary process that is performed by the dropout processing unit in the modification in which the lightness threshold distribution is used.

Note that, similarly to the process illustrated in FIG. 2, in the process illustrated in FIG. 7, the lightness determination process (S14) and the saturation determination process (S18) may be performed in reverse order (see FIG. 8). In the process illustrated in FIG. 8, after a lightness threshold that corresponds to the hue of a processing target pixel has been retrieved in S13, the saturation of the target pixel is compared with the saturation threshold (S18). As a result of the comparison, in the case where it is determined that the saturation of the target pixel is lower than or equal to the saturation threshold, the pixel is output as is (S16). Otherwise, the lightness of the target pixel is further compared with the lightness threshold, which has been retrieved in S13 (S14). As a result of the comparison in S14, in the case where it is determined that the lightness of the target pixel is lower than or equal to the lightness threshold, the pixel is output as is (S20). Otherwise, the target pixel is dropped out (S22).

In the case of FIG. 7 in which lightness is determined first and also in the case of FIG. 8 in which, contrary to the case of FIG. 7, saturation is determined first, the relationship illustrated in FIG. 4, which has been described in the above descriptions that relate to FIG. 2 and FIG. 3, is satisfied. In other words, in the case where the saturation of a pixel exceeds a saturation threshold, when the lightness of the pixel exceeds a lightness threshold that corresponds to the hue of the pixel, the pixel is to be dropped out, and when the lightness of the pixel is lower than or equal to the lightness threshold, the pixel is not to be dropped out. In addition, in the case where the saturation of the pixel is lower than or equal to the saturation threshold, the pixel is not to be dropped out regardless of whether or not the lightness of the pixel exceeds the lightness threshold.

In the exemplary embodiment and the modification, which have been described above, the case where the color of a character or the like that is to be left without being dropped out by color dropout processing is black has been described. Another modification in which a character or the like that is written by using a chromatic color pen or the like such as a red or blue ballpoint pen is also to be left without being dropped out will be described below.

Also in this modification, the exemplary process of dropout processing illustrated in FIG. 7 is used. However, as a lightness threshold distribution that is used for the lightness determination process, a lightness threshold distribution with consideration of the color of a color material that is used in a tool (e.g., a pen or a printer) used for writing a character or the like, which is to be left, is used. The lightness threshold distribution that is used in the modification will be described with reference to FIG. 9.

Figure 9:
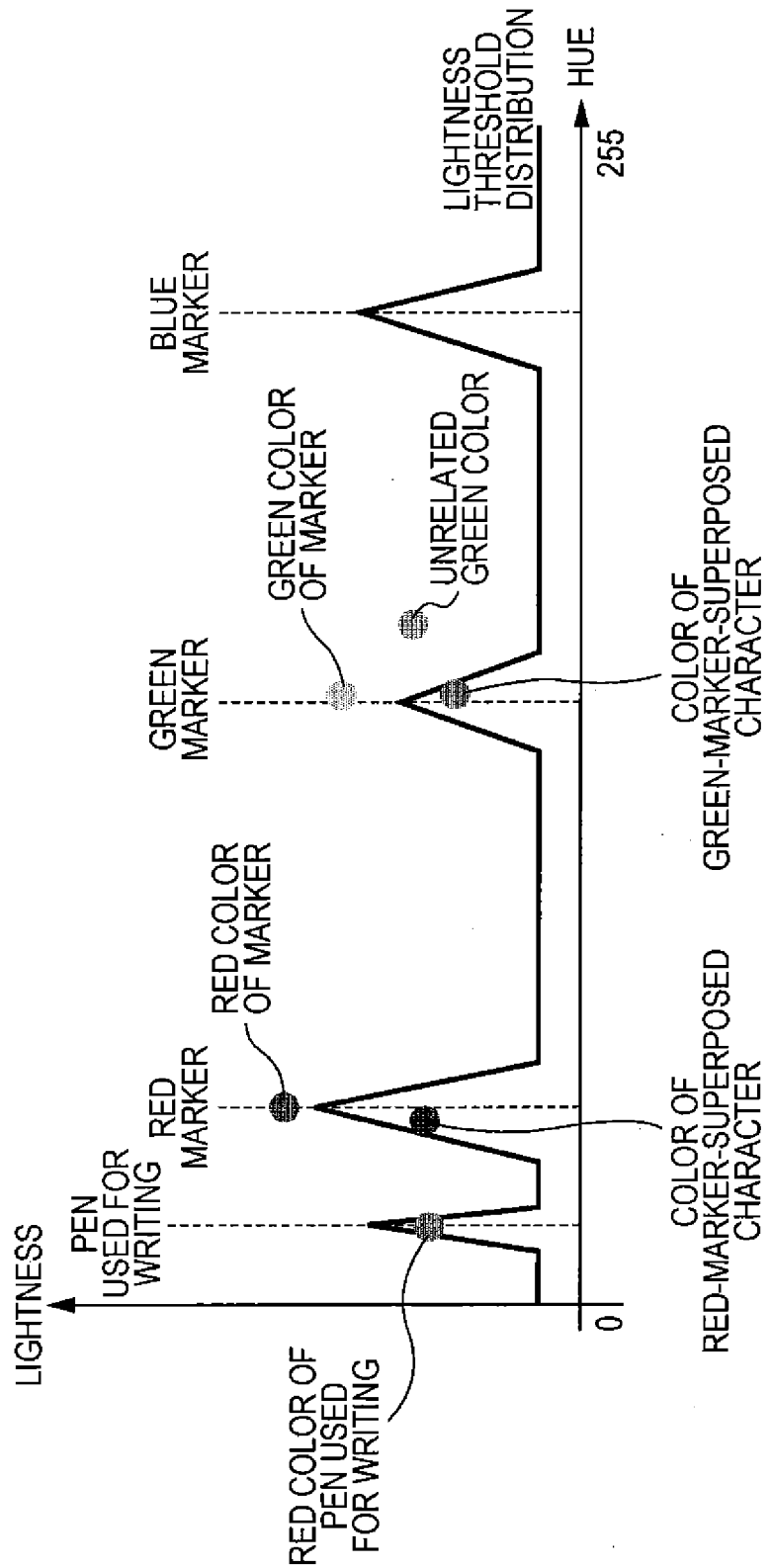

The exemplary lightness threshold distribution illustrated in FIG. 9 corresponds to the exemplary markers of three colors illustrated in FIG. 6 and is used for leaving a character or the like that is written by using a predetermined red pen without dropping out the character or the like. In the lightness threshold distribution, a lightness threshold that corresponds to the hue range of red color of the red pen is set to be higher than the lightness of red color of the red pen. This lightness threshold is higher than a lightness threshold that corresponds to a hue that does not belong to any of the hue ranges of the markers and the red pen. By using such a lightness threshold distribution, it is determined in S14 in the process illustrated in FIG. 7 that the lightnesses of pixels of the character or the like, which have been written by using the red pen, in an input image are lower than or equal to the lightness threshold, which corresponds to the red pen, and thus, each of the pixels is output as is without being dropped out (S16).

The image processing apparatus, which has been described as an example, is realized by, for example, causing a general-purpose computer to execute programs that represent processing to be performed by each functional module of the image processing apparatus. Here, the computer has a circuit configuration in which, as hardware, for example, a microprocessor such as a CPU, memories (first memories), such as a random access memory (RAM) and a read only memory (ROM), a second-memory controller that controls second memories such as a hard disk drive (HDD), a solid state drive (SSD), and a flash memory, various input/output (I/O) interfaces, a network interface that controls connection with a wireless or wired network, and the like are connected to one another via, for example, buses. A disc drive that is used for performing read and/or write operations on a transportable disc recording media such as CDs, DVDs, and blu-ray discs, a memory reader-writer that is used for performing read and/or write operations on transportable non-volatile recording media of various standards such as flash memories, and the like may be connected to the buses via, for example, the I/O interfaces. Programs in which the contents of processing to be performed by each functional module, which have been described above as examples, are written are stored in a second memory such as hard disk via a recording medium such as a CD or a DVD or via a communication unit such as a network and installed in a computer. The programs, which have been stored in the second memory, are read by the RAM and executed by the microprocessor such as a CPU, and as a result, a functional module group, which includes the functional modules described above as examples, are realized.

In addition, although the case where HSL color space is employed has been described in the above-described exemplary embodiment and modifications, HSV color space that is formed of, similarly to HSL color space, hue, saturation, and lightness may be employed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a computer processor configured to eliminate a specific color in image information,
wherein the computer processor does not consider a pixel having a saturation that exceeds a saturation threshold and a lightness that is lower than a lightness threshold, which corresponds to a hue of the pixel, as an elimination target and considers a pixel having a saturation that exceeds the saturation threshold and a lightness that is higher than the lightness threshold, which corresponds to a hue of the pixel, as the elimination target, such that elimination target pixels are removed from the image information, and
wherein the lightness threshold is defined based on a hue of a marking made by a marker superposed with the pixel.

2. An image processing method comprising:
eliminating a specific color in image information,
wherein a pixel having a saturation that exceeds a saturation threshold and a lightness that is lower than a lightness threshold, which corresponds to a hue of the pixel, is not considered as an elimination target, and a pixel having a saturation that exceeds the saturation threshold and a lightness that is higher than the lightness threshold, which corresponds to a hue of the pixel, is considered as the elimination target, such that elimination target pixels are removed from the image information, and
wherein the lightness threshold is defined based on a hue of a marking made by a marker superposed with the pixel.

3. A non-transitory computer readable medium storing a program causing a computer to perform a process, the process comprising:
eliminating a specific color in image information,
wherein a pixel having a saturation that exceeds a saturation threshold and a lightness that is lower than a lightness threshold, which corresponds to a hue of the pixel, is not considered as an elimination target and a pixel having a saturation that exceeds the saturation threshold and a lightness that is higher than the lightness threshold, which corresponds to a hue of the pixel, is considered as the elimination target such that elimination target pixels are removed from the image information, and
wherein the lightness threshold is defined based on a hue of a marking made by a marker superposed with the pixel.

\* \* \* \* \*